G. T. CARPENTER, DEC'D.

F. C. CARPENTER, EXECUTRIX.

DENTAL TOOL FOR REMOVING CROWN PINS.

APPLICATION FILED AUG. 9, 1907.

Reissued Jan. 16, 1912.

13,361.

Witnesses,
F. S. Mann
S. N. Sond

Inventor,
George T. Carpenter
By Offield, Towle & Linthicum
Atty's.

UNITED STATES PATENT OFFICE.

GEORGE T. CARPENTER, OF CHICAGO, ILLINOIS; FLORA C. CARPENTER, EXECUTRIX OF SAID GEORGE T. CARPENTER, DECEASED, ASSIGNOR TO FRANK H. SKINNER, OF CHICAGO, ILLINOIS.

DENTAL TOOL FOR REMOVING CROWN-PINS.

13,361. Specification of Reissued Letters Patent. Reissued Jan. 16, 1912.

Original No. 812,976, dated February 20, 1906, Serial No. 266,493. Application for reissue filed August 9, 1907. Serial No. 387,932.

*To all whom it may concern:*

Be it known that I, GEORGE T. CARPENTER, a citizen of the United States, residing at Chicago, in the county of Cook and State of Illinois, have invented certain new and useful Improvements in Dental Tools for Removing Crown-Pins; and I do hereby declare the following to be a full, clear, and exact description of the invention, such as will enable others skilled in the art to which it appertains to make and use the same.

This invention relates to improvements in dental tools or vises for removing crown pins.

The object of the invention is to provide a vise of this character by means of which the crown pin may be removed from the natural root of a tooth after an artificial crown has been broken off the same.

A further object is to provide a vise of this character which will be simple, strong, and durable in construction and by the use of which a firm hold may be taken upon the crown pin, means being provided whereby the vise may be readily operated to withdraw said pin from the root of the tooth.

With the above and other objects in view the invention consists of certain novel features of construction, combination, and arrangement of parts, as will be hereinafter described and claimed.

Figure 1:
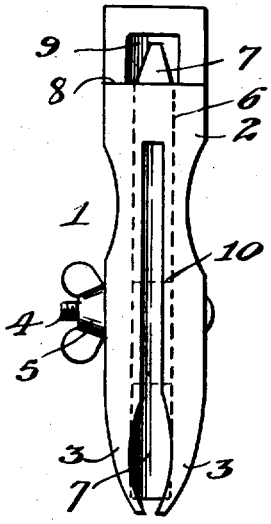
Figure 2:
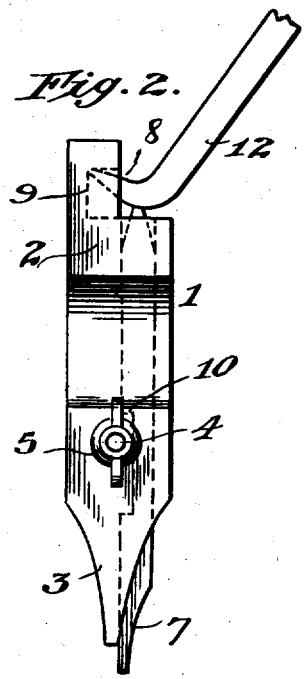
Figure 3:
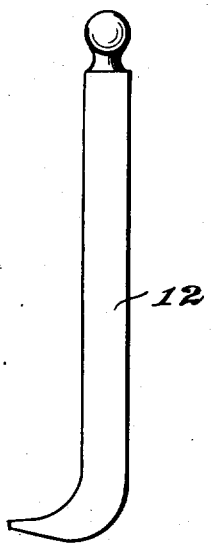

In the accompanying drawings, Figure 1 is a front view of the vise, showing the parts in inoperative position. Fig. 2 is a side view of the vise, showing the manner of using the same. Fig. 3 is a side view of the lever for operating the vise.

Referring more particularly to the drawings, 1 denotes the vise, which consists of a body portion 2 and spring-jaws 3, said jaws being preferably tapered to a point at their lower ends. Through the jaws 3 is arranged a threaded bolt or screw 4, one end of which is secured to one of said jaws, while the opposite end extends loosely through a transversely-disposed aperture formed in the other jaw of the vise. Adapted to be screwed upon the projecting threaded end of the screw or bolt 4 is a thumb-nut 5, which when screwed up upon said bolt will clamp the jaws of the vise together upon the object to which they may be engaged. Through the vise is formed a longitudinally-disposed passage 6, in which is loosely arranged a thrust-member in the form of a rod or post 7, the outer end of which is preferably tapered, as shown. The upper end of the vise 1 is cut away to form a right-angularly-disposed notch 8, and in the inner side of the upwardly-projecting end of the vise is formed a recess or hollow 9. In the post 7, substantially midway between the ends of the same, is formed a notch or recess 10, which is adapted to be engaged by the bolt or screw 4 to limit the movement of the rod or post 7 in the passage 6 of the vise.

The vise 1 is adapted to be raised and lowered upon the post 7 by means of a right-angularly-bent lever 12, the lower right-angularly-bent end of which is adapted to be engaged with the recess 9 formed in the notched upper portion of the vise, the angularly-bent end of said lever being adapted to rest upon the upper end of the rod or post 7, which forms a fulcrum-point for said lever, upon which the same may be rocked to move the vise outwardly on said post after the ends of the jaws of the vise have been brought into engagement with and clamped upon the crown pin or other object to be extracted; said post in such operation exerting a thrust upon the root of the tooth equal and opposed to the pulling action of the vise, thus neutralizing the pulling action of the vise upon the root itself.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

I claim:

1. In a dental tool, the combination with a rod or post, of a vise having formed therethrough a vertically-disposed passage whereby the same is engaged with said post, said vise having its upper end cut away and recessed, and a lever adapted to be engaged with the upper end of said rod and with the recess in said vise whereby the latter is forced outwardly on said rod, substantially as described.

2. In a dental tool, the combination with a rod or post, of a vise having formed therein a vertically-disposed passage whereby the same is engaged with said post, spring-jaws formed on the inner end of said vise, a screw to operate said jaws and a lever adapted to be fulcrumed on said rod and engaged with said vise to force the latter outwardly on said rod, substantially as described.

GEORGE T. CARPENTER.

Witnesses:
SAMUEL N. POND,
FREDERICK C. GOODWIN.

Copies of this patent may be obtained for five cents each, by addressing the "Commissioner of Patents, Washington, D. C."